H. LEWIS.
Hose-Couplings.
No. 136,328.  Patented Feb. 25, 1873.
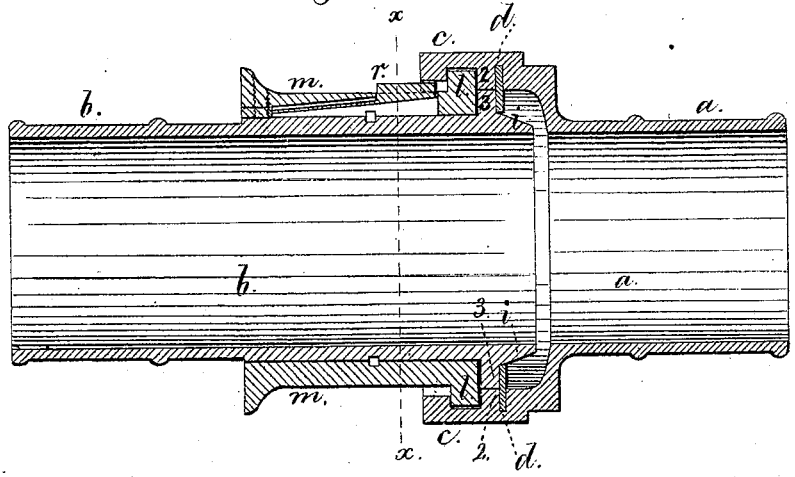
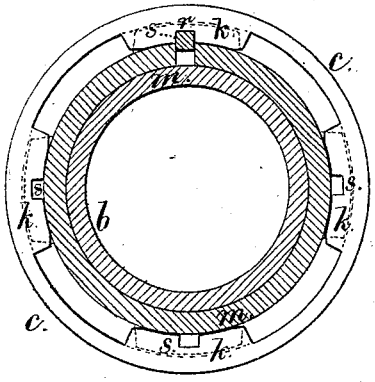
Witnesses  
Chas H Smith  
Geo. D. Walker
Inventor  
Homer Lewis,  
Lemuel W. Serrell att'y

UNITED STATES PATENT OFFICE.

HOMER LEWIS, OF BENNINGTON, VERMONT.

IMPROVEMENT IN HOSE-COUPLINGS.

Specification forming part of Letters Patent No. 136,328, dated February 25, 1873.

*To all whom it may concern:*

Be it known that I, HOMER LEWIS, of Bennington, in the county of Bennington and State of Vermont, have invented an Improvement in Hose-Coupling, of which the following is a specification:

This coupling is made in such a manner that the pressure of the water tightens the packing; but the parts of the coupling can be slipped together or separated with great facility.

I make use of an elastic or flexible ring with a central opening slightly smaller than the largest part of the tapering end of the coupling that is inserted into the same, so that the pressure of water acts to drive the flexible ring upon the tapering end and expand the same to tighten both the inner and the outer edges of the ring, and the flat side of the ring takes a bearing against a nearly flat surface in which is the joint between the two parts of the coupling, so that in addition to the edges being rendered tight the pressure forces the ring against a flat bearing, rendering leakage impossible. The two ferrules or cylinders of the coupling are locked together by segmental lugs, and a spring-lock is employed to keep the parts from turning and separating.

In the drawing, Figure 1 is a longitudinal section of the coupling complete; and Fig. 2 is a cross-section at the line $x\ x$.

The cylinders or ferrules $a$ and $b$ of the coupling are of a size to receive the hose or pipe to be coupled, and said cylinders are connected with the pipe or hose in any convenient manner. The cylinder $a$ is enlarged to form the coupling-socket $c$, and within the same is a groove for the elastic ring $d$ and a flange or bearing, 2, for the same. The end of the cylinder $b$ is made conical or tapering at $i$, and provided with a bearing-surface at 3.

When the parts are put together and locked by mechanism, hereafter described, the surfaces 2 and 3 are in line and flush with each other, and the only joint or opening through which water could pass is between them; but as the cone $i$ has spread the ring $d$, as the parts were put together, the pressure of water upon the flat side of that ring only serves to drive the same upon the taper $i$, and cause it to take a firm bearing against the surfaces 2 and 3, effectually preventing leakage at this point.

To lock the cylinders $a$ and $b$ together any suitable device may be used; but I prefer the lugs $k$ upon the inside of the socket $c$, and the lugs $l$ either upon the sleeve $m$ or upon the cylinder $b$. These lugs are of a size to pass freely by each other in setting the coupling together, and a movement of about one-sixth of a revolution brings the lugs into line and effectually prevents separation of the parts of the coupling until they are again partially rotated. If the separate sleeve $m$ is used the cylinder $b$ will not require to be rotated in coupling or uncoupling, as the sleeve $m$ is the only part needing to be turned.

I make use of a spring-catch, $r$, that is positioned so as to catch into one of the notches $s$ in one of the lugs $k\ k$, so as to retain the parts in the locked position. This spring-catch is easily pressed back with the thumb or finger when the parts are to be disconnected.

It is preferable to introduce the spring-catch $r$ from the back or inner part of the sleeve $m$, and allow the block at the end to project through a mortise, and form the catch that enters one of the notches $s$.

I claim as my invention—

1. The coupling-cylinder $b$, with the tapering end $i$ and bearing-surface 3, in combination with the elastic ring $d$, coupling-socket $c$, and bearing-surface 2, substantially as and for the purposes set forth.

2. The spring-catch $r$, in combination with the interlocking lugs of the respective parts of the coupling, the lugs $k$ having notches $s$ for such spring-catch $r$, as and for the purposes set forth.

Signed by me this 15th day of November, A. D. 1872.

HOMER LEWIS.

Witnesses:
 J. H. WOODMANN,
 JAS. B. MEACHAM.